Nov. 6, 1928.

A. HIRTH

CRANK SHAFT

Original Filed Dec. 22, 1920

Inventor:
Albert Hirth
By Rogers, Kennedy & Campbell

Patented Nov. 6, 1928.                                    1,690,296

UNITED STATES PATENT OFFICE.

ALBERT HIRTH, OF CANNSTATT-STUTTGART, GERMANY.

CRANK SHAFT.

Original application filed December 22, 1920, Serial No. 432,445, and in Germany January 16, 1920. Divided and this application filed October 11, 1924. Serial No. 743,090.

My invention refers to crank shafts and has for its object to provide an improved built up crank shaft, the several members constituting this shaft being so shaped that they can be assembled in a great number of different angular positions, all the crank pins and journals being and remaining strictly parallel and all the bearing journals being on one and the same axis.

In order that this end be attained, the crank pins or journals forming part of the crank shaft according to this invention which is a division of my original application filed December 22, 1920, Serial No. 432,445, now Patent No. 1,514,768, are provided with conical ends and the crank arms have conical seats formed therein. In the conical ends of the crank pins or journals as well as in the conical seats of the crank arms there are formed circular rows of alternating V-shaped grooves and projections, and the projections on the conical ends of the crank pins or journals fit so closely in the grooves of the conical seats that the entire surface of each end is in intimate contact with the entire surface of its seat. Means are provided for permanently maintaining this contact, such means preferably extending axially through the pin or journal. The interlocking of the teeth thus formed on the contacting ends and seats brings about a very positive locking of the parts as the sloping surfaces of the grooves and projections act with a wedging effect on each other and insure an absolute final positioning of the parts without looseness or liability of displacement. In view of the possibility of thus interlocking the parts in a great variety of relative angular positions the same members can be used in the construction of shafts for engines having any desired number of cylinders. Thus with twenty four projections or teeth on each end and seat the resulting pitch angle of 15° will allow of varying the angular position of the members to suit any desired number of cylinders.

In the drawings affixed to this specification and forming part thereof a crank shaft embodying my invention is illustrated by way of example.

Figure 1:
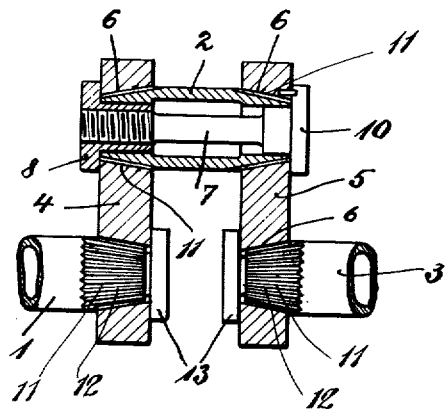
Fig. 1 is an axial section of part of the crank shaft.

Referring to the drawings, 1 and 3 are journals (or crank pins) connected with corresponding ends of the crank arms 4, 5 while 2 is a crank pin forming the connection between the opposite ends of these arms.

Figure 2:
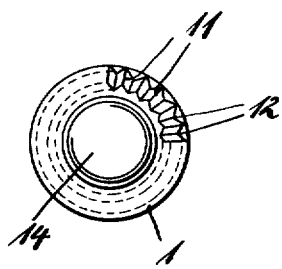
Fig. 2 is an end view of one of the crank pins or journals.
Figure 3:
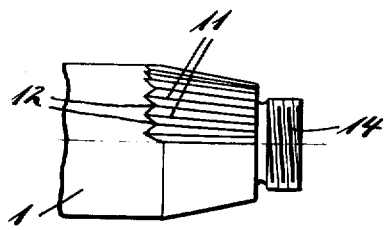
Fig. 3 is an elevation of the end of the same.

The journals and the crank pin are fixed to the crank arms by their conical ends being seated in corresponding conical borings or seats provided in the crank arms, the contacting surfaces of the journals or crank pin and of the seats in the crank arms being formed into alternating circular rows of V-shaped grooves and projections, as shown for instance in Figs. 2 and 3, where 11 indicates the projections formed on the end of the journal 1 and only shown in part, these projections having a triangular cross section and being separated by grooves 12 having a similar cross section and also shown only in part. The conical rows of triangular teeth thus formed on the ends of the journals or crank pin and on the surface of the borings or seats 6 in the crank arms 4, 5 are forced into intimate contact by means of suitable devices acting in axial direction and pressing the co-operating surfaces together. In Fig. 1 two such fixing means are illustrated. The journals 1, 3 are forced into their seats by means of nuts 13 co-operating with threaded pins 14 mounted on the ends of the journals.

On the other hand the crank pin 2 is shown in Fig. 1 as being tubular, a threaded screw bolt 7 extending axially through the crank pin with its head 10 resting on the outer lateral surface of the crank arm 5 and its threaded end projecting through the crank arm 4, a sleeve nut 8 being screwed down on this end of the bolt with its head resting against the outer lateral surface of crank arm 4. By tightening nut 8 the crank arms 4, 5 are forcibly pressed onto the conical seats formed on the ends of the crank pin 2, the conical teeth formed on these ends and in the seats 6 of the crank arms being thereby brought to intimate contact all over their surface.

Obviously, the interlocking of the sharp-edged teeth on the ends of the crank pin or journals and on the inner surface of the seats brings about a very positive locking of the parts when the nuts 13 or 8 are drawn up, as the sloping surfaces of the teeth insure an absolute final positioning of the parts without any looseness or liability of displacement.

I wish it to be understood that I do not desire to be limited to the exact details of construction shown and described, for obvious modifications will occur to a person skilled in the art.

I claim:

A built up crank shaft structure comprising two crank arms provided with pairs of conical seats, the seats in each crank arm facing in opposite directions and having V-shaped grooves and projections, two journals provided with conical ends fitting respectively in the seats of one pair and extending in opposite directions outwardly therefrom to constitute the axis of the crank shaft structure, said conical ends having V-shaped grooves and projections in intimate contact with the entire surface of the grooves and projections in the seats, and said conical ends having terminal threaded pins, nuts screwed on said pins and bearing against the sides of the crank arms and acting to maintain the intimate contact of the grooves and projections, a hollow crank pin extending between said crank arms and formed with conical ends fitting in the conical seats of the other pair and having V-shaped grooves and projections in intimate contact with the entire surface of the grooves and projections in the associated seats, a bolt extending through said crank pin and having on one end a head bearing against one crank arm and having on its other end a nut bearing against the other crank arm and acting to maintain the intimate contact of the grooves and projections; whereby in a crank shaft structure involving a plurality of pairs of crank arms and a plurality of crank pins, the parts of the structure may be assembled in a great number of different relative angular positions and be firmly held with the journals in the same axis and in parallel relation to the crank pins.

In testimony whereof, I have affixed my signature hereto.

ALBERT HIRTH.

CERTIFICATE OF CORRECTION.

Patent No. 1,690,296.   Granted November 6, 1928, to

ALBERT HIRTH.

It is hereby certified that the above numbered patent was erroneously issued to the inventor said "Hirth", as owner of said invention, whereas said patent should have been issued to "Aktiebolaget Svenska Kullagerfabriken, of Goteborg, Swenden, a corporation of Sweden", said corporation being assignee of the entire interest in said invention, as shown by the records of assignments in this office; and that the said Letters Patent should be read with this correction therein that the same may conform to the record of the case in the Patent Office.

Signed and sealed this 8th day of January, A. D. 1929.

(Seal)

M. J. Moore,
Acting Commissioner of Patents.

construction shown and described, for obvious modifications will occur to a person skilled in the art.

I claim:

A built up crank shaft structure comprising two crank arms provided with pairs of conical seats, the seats in each crank arm facing in opposite directions and having V-shaped grooves and projections, two journals provided with conical ends fitting respectively in the seats of one pair and extending in opposite directions outwardly therefrom to constitute the axis of the crank shaft structure, said conical ends having V-shaped grooves and projections in intimate contact with the entire surface of the grooves and projections in the seats, and said conical ends having terminal threaded pins, nuts screwed on said pins and bearing against the sides of the crank arms and acting to maintain the intimate contact of the grooves and projections, a hollow crank pin extending between said crank arms and formed with conical ends fitting in the conical seats of the other pair and having V-shaped grooves and projections in intimate contact with the entire surface of the grooves and projections in the associated seats, a bolt extending through said crank pin and having on one end a head bearing against one crank arm and having on its other end a nut bearing against the other crank arm and acting to maintain the intimate contact of the grooves and projections; whereby in a crank shaft structure involving a plurality of pairs of crank arms and a plurality of crank pins, the parts of the structure may be assembled in a great number of different relative angular positions and be firmly held with the journals in the same axis and in parallel relation to the crank pins.

In testimony whereof, I have affixed my signature hereto.

ALBERT HIRTH.

CERTIFICATE OF CORRECTION.

Patent No. 1,690,296.  Granted November 6, 1928, to

ALBERT HIRTH.

It is hereby certified that the above numbered patent was erroneously issued to the inventor said "Hirth", as owner of said invention, whereas said patent should have been issued to "Aktiebolaget Svenska Kullagerfabriken, of Goteborg, Swenden, a corporation of Sweden", said corporation being assignee of the entire interest in said invention, as shown by the records of assignments in this office; and that the said Letters Patent should be read with this correction therein that the same may conform to the record of the case in the Patent Office.

Signed and sealed this 8th day of January, A. D. 1929.

(Seal)

M. J. Moore,
Acting Commissioner of Patents.